(12) United States Patent
Lazarevich et al.

(10) Patent No.: US 9,193,290 B2
(45) Date of Patent: Nov. 24, 2015

(54) REMOVABLE STORAGE ARRANGEMENT FOR A VEHICLE

(75) Inventors: Robert R. Lazarevich, Rochester, MI (US); David B. Reed, Lake Orion, MI (US); Peter W. Mattes, Royal Oak, MI (US); Gary D. Lock, Chesterfield Township, MI (US)

(73) Assignee: FCA US LLC, Auburn Hills, MI (US)

( * ) Notice: Subject to any disclaimer, the term of this patent is extended or adjusted under 35 U.S.C. 154(b) by 455 days.

(21) Appl. No.: 13/554,095

(22) Filed: Jul. 20, 2012

(65) Prior Publication Data

US 2014/0021232 A1    Jan. 23, 2014

(51) Int. Cl.
| | |
|---|---|
| B60R 7/00 | (2006.01) |
| B60R 11/00 | (2006.01) |
| B60P 3/14 | (2006.01) |
| B60R 7/02 | (2006.01) |
| B60R 7/04 | (2006.01) |
| B60R 9/00 | (2006.01) |
| B60R 11/06 | (2006.01) |

(52) U.S. Cl.
CPC ... *B60P 3/14* (2013.01); *B60R 7/02* (2013.01); *B60R 7/04* (2013.01); *B60R 9/00* (2013.01); *B60R 11/06* (2013.01)

(58) Field of Classification Search
CPC .... B60R 7/02; B60R 2011/0019; B60R 7/00; B62B 1/00
USPC ............ 224/539, 540, 543, 281; 280/47.315; 296/37.1, 37.6, 26.09; 211/162; 312/330.1
See application file for complete search history.

(56) References Cited

U.S. PATENT DOCUMENTS

| | | | | |
|---|---|---|---|---|
| 2,455,417 | A * | 12/1948 | Holan et al. | 296/37.6 |
| 3,068,038 | A * | 12/1962 | Douglass, Jr. | 296/37.6 |
| 3,245,713 | A * | 4/1966 | Ogilvie | 296/37.6 |
| 3,722,946 | A * | 3/1973 | Cary | 296/165 |
| 4,522,442 | A * | 6/1985 | Takenaka | 296/37.1 |
| 4,685,695 | A | 8/1987 | LeVee | |

(Continued)

FOREIGN PATENT DOCUMENTS

WO        99/03719        1/1999

OTHER PUBLICATIONS

International Search Report dated Sep. 23, 2013 for International Application No. PCT/US2013/048504, International Filing Date Jun. 28, 2013.

(Continued)

*Primary Examiner* — Justin Larson
*Assistant Examiner* — Lester L Vanterpool
(74) *Attorney, Agent, or Firm* — Ralph E. Smith

(57) ABSTRACT

A cargo management system can include a receptacle and a removable storage device. The receptacle can be formed relative to an exterior panel of the vehicle and can have a rear wall spaced apart from an outer surface of the exterior panel. The outer surface can have a first contour. The removable storage device can be removably received in the receptacle and selectively secured to the vehicle. The storage device can include an upper portion, a lower portion and a latch mechanism. The upper portion can be pivotable relative to the lower portion to provide access to an interior of the storage device. The latch mechanism can selectively secure the storage device to the vehicle when in a stored position in the receptacle. An outer surface of the upper portion and the lower portion can include a second contour, where the second contour can substantially match the first contour.

19 Claims, 5 Drawing Sheets

(56) References Cited

U.S. PATENT DOCUMENTS

| | | |
|---|---|---|
| 5,255,832 A | 10/1993 | Christensen |
| 5,895,086 A * | 4/1999 | Carico ............... 296/37.6 |
| 5,924,616 A | 7/1999 | Shives |
| 6,089,639 A * | 7/2000 | Wojnowski ............ 296/37.6 |
| 6,485,077 B1 * | 11/2002 | Foster et al. ............ 296/37.1 |
| 6,923,354 B2 * | 8/2005 | Axelson ............... 224/404 |
| 7,097,224 B2 | 8/2006 | Lester et al. |
| 7,413,231 B1 | 8/2008 | Wood et al. |
| 7,686,365 B2 * | 3/2010 | Thelen et al. ........... 296/37.6 |
| 7,708,329 B2 | 5/2010 | Duller |
| 7,722,111 B2 | 5/2010 | Reich et al. |
| 7,828,356 B2 | 11/2010 | Wood et al. |
| 8,123,007 B2 * | 2/2012 | Murdoch et al. ........... 190/18 A |
| 8,360,446 B1 * | 1/2013 | Hertan ............... 280/47.35 |
| 2001/0038219 A1 * | 11/2001 | Clare et al. ............ 296/37.6 |
| 2001/0038230 A1 * | 11/2001 | Clare et al. ............ 296/189 |
| 2006/0191105 A1 | 8/2006 | Walker |
| 2006/0279099 A1 * | 12/2006 | Ranka et al. ............ 296/37.6 |
| 2009/0074532 A1 | 3/2009 | Wood et al. |

OTHER PUBLICATIONS

Written Opinion dated Sep. 23, 2013 for International Application No. PCT/US2013/048504, International Filing Date Jun. 28, 2013.

* cited by examiner

REMOVABLE STORAGE ARRANGEMENT FOR A VEHICLE

FIELD

The present disclosure relates generally to a storage arrangement for a vehicle and, more particularly, to removable storage arrangements for a vehicle.

BACKGROUND

Generally, it is known to provide a cargo bed with a floor for a vehicle, such as a pick-up truck. The cargo bed together with side walls and the floor can define a cargo carrying area. It is also generally known to provide external storage boxes that can be mounted within the cargo bed, typically adjacent to a cab of the pick-up truck. Such external storage boxes typically span the width of the cargo bed and are accessible from within the cargo bed of the vehicle. One disadvantage of such external storage boxes is that they are not easily accessible from outside of the cargo bed or cargo carrying area. Another disadvantage of such external storage boxes is that they are fastened or mounted to the vehicle such that they are not removable or portable. Yet another disadvantage of such external storage boxes is that they reduce a size of the cargo carrying area and do not allow full use of the cargo bed. Thus, there remains a need in the relevant art for a removable storage device that overcomes the aforementioned and other disadvantages.

SUMMARY

In one form, a cargo management system for a vehicle is provided in accordance with the teachings of the present disclosure. The cargo management system can include a receptacle and a removable storage device. The receptacle can be formed relative to an exterior panel of a motor vehicle, and can have a rear wall spaced apart from an outer surface of the exterior panel. The outer surface of the exterior panel can have a first contour. The removable storage device can be configured to be removably received in the receptacle and selectively secured to the vehicle. The removable storage device can include an upper portion, a lower portion and a latch mechanism. The upper portion can be pivotable relative to the lower portion to provide access to an interior of the removable storage device. The latch mechanism can be configured to selectively secure the removable storage device to the vehicle when in a stored position in the receptacle. An outer surface of the upper portion and an outer surface of the lower portion can include a second contour, where the second contour can substantially match the first contour.

In another form, a cargo management system for a vehicle is provided in accordance with the teachings of the present disclosure. The cargo management system can include a receptacle and first and second removable storage devices. The receptacle can be formed relative to an exterior panel of a pick-up truck. The pick-up truck can have a cargo bed and an inner side wall with a first side facing the cargo bed and an opposite side facing the exterior panel. The receptacle can be positioned between the exterior panel and the inner side wall, and the outer surface of the exterior panel can have a first contour. The first and second removable storage devices can each be configured to be removably received in the receptacle and selectively secured to the pick-up truck. Each of the removable storage devices can include an upper portion, a lower portion and a latch mechanism. The upper portion can be pivotably coupled to the lower portion to provide access to an interior compartment of the removable storage device. The latch mechanism can be associated with the lower portion and configured to selectively secure each removable storage device to the pick-up truck when in a stored position in the receptacle. An outer surface of the upper portion and an outer surface of the lower portion can comprise a second contour, where the second contour can substantially match the first contour.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Figure 1:
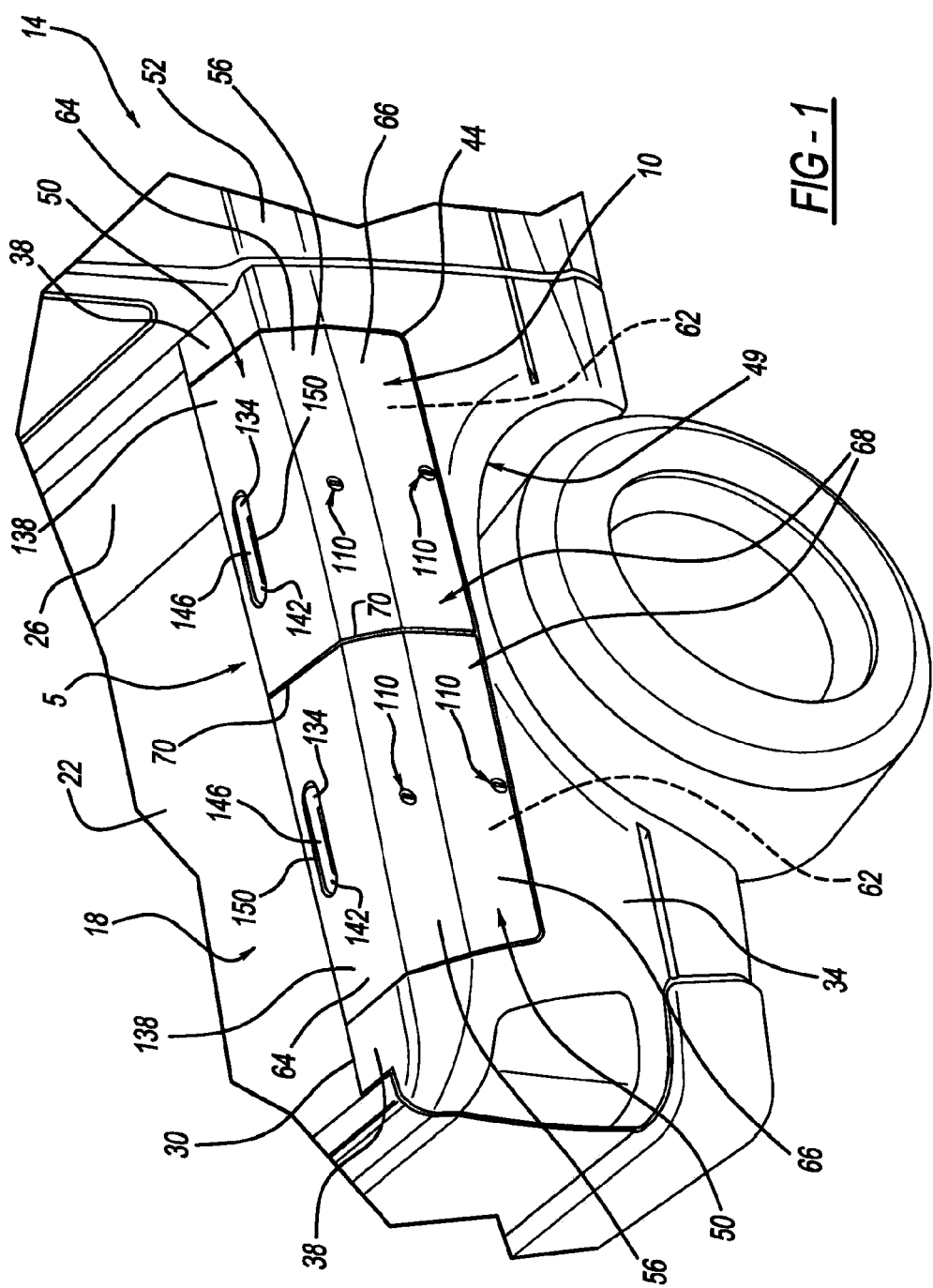
FIG. 1 is a partial perspective view of an exemplary removable storage device arrangement shown in a stored position in an exemplary vehicle according to the principles of the present disclosure.

With initial reference to FIG. 1, an exemplary cargo management system 5 including a removable storage device arrangement 10 associated with an exemplary motor vehicle 14 is provided in accordance with the present teachings. In the exemplary configuration illustrated, motor vehicle 14 is a pick-up truck having a cargo bed 18. Cargo bed 18 can be defined by a floor 22, a forward wall 26 and inner side walls 30, noting that only the passenger side inner side wall 30 is shown. Pick-up truck 14 can also include an exterior panel or rear fender 34 spaced apart from its corresponding inner side wall 30 and an upper or top panel 38 spanning between the inner side walls 30 and the respective exterior panel 34. It should be appreciated that while the discussion will continue with reference to vehicle 14 being a pick-up truck, the removable storage device arrangement 10 can be associated with various different vehicle configurations and models.

Figure 2:
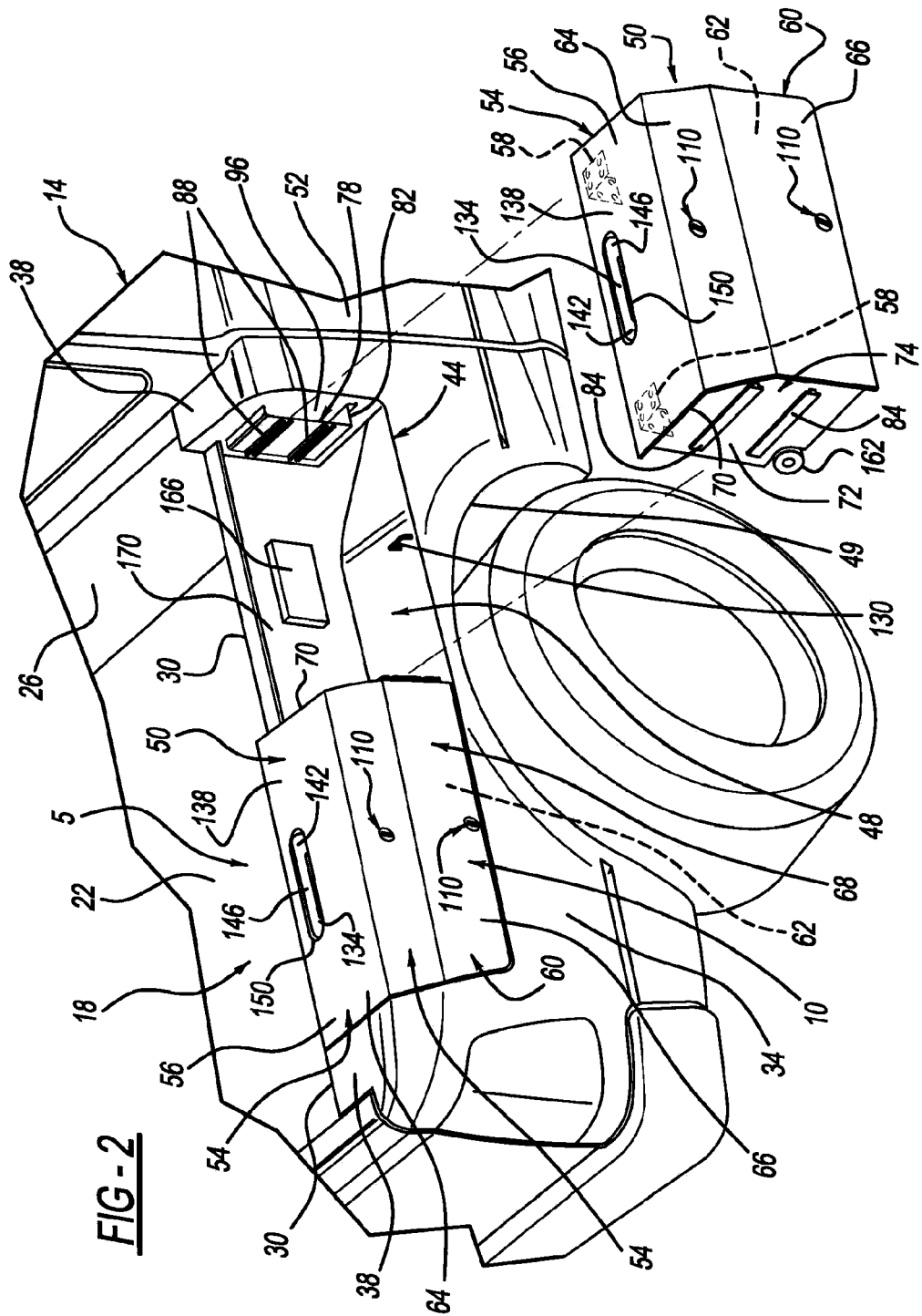
FIG. 2 is a partial perspective view of the exemplary removable storage device arrangement of FIG. 1 showing one storage device removed from the vehicle according to the principles of the present disclosure.

A receptacle 44 can be formed into or relative to the exterior and top panels 34, 38 in a space 48 between the inner side wall 30 and exterior panel 34, as best shown in FIG. 2. That is, as can best be seen in FIGS. 2 and 3, receptacle 44 extends between the inner side wall 30 and exterior panel 34 with a portion of inner side wall 30 providing a rear wall of receptacle 44. As will be discussed in greater detail below, the receptacle 44 can be sized and shaped to receive the removable storage device arrangement 10 so as to be easily accessible from an exterior of the pick-up truck 14 without having to enter the cargo bed 18, such as from a position standing adjacent to exterior panel 34.

With additional reference to FIGS. 2-5, the removable storage device arrangement 10 will now be discussed in greater detail. The removable storage device arrangement 10 can include one or more removable storage devices 50 sized and shaped for removable receipt in receptacle 44. In the exemplary configuration illustrated in FIGS. 1-4, the removable storage device arrangement 10 includes two removable storage devices 50 positioned in receptacle 44 on a passenger side 52 of pick-up truck 14. In this exemplary configuration, a hinged lid 56 can open in a direction toward the cargo bed 18 when the removable storage device 50 is in a stored or stowed position such that an interior or internal compartment of the storage device 50 is accessible from the exterior of the pick-up truck 14. In one exemplary configuration, at least a portion of receptacle 44 can be positioned over a rear wheel well 49 of pick-up truck 14. It should be appreciated that while the removable storage device arrangement 10 is shown associated with the passenger side 52, the removable storage device arrangement 10 can also be provided on a driver side of the vehicle in the same manner as discussed herein for passenger side 52.

Each removable storage device 50 can include an upper portion 54 having the hinged lid 56 and a lower portion 60 forming an internal compartment 62 for receipt and/or storage of various items. In one exemplary configuration, one or more hinges 58 (FIG. 2) can hingably couple lid 56 to lower portion 60. As can be seen in FIGS. 1-4, an outer surface 64 of the hinged lid 56 and an outer surface 66 of the lower portion 60 can be sized and shaped so as to align with the size and shape of rear fender 34 and top panel 38 when the storage device(s) 50 are stored in a stowed or stored position 68 in receptacle 44. In other words, the outer surfaces 64, 66 can have a contour that matches or substantially matches a contour of an outer surface of exterior panel 34. In one exemplary configuration having the two removable storage devices 50, the storage devices can be positioned contiguous to each other such that edges 70 of the upper and lower portions 54, 60 are contiguous to each other, as shown for example in FIG. 1.

The lower portion 60 can include lateral side walls 72 (FIGS. 2 and 3) each having a first coupling arrangement 74 for removably coupling the storage devices 50 to the receptacle 44 via a mating second coupling arrangement 78. In one exemplary configuration, the first coupling arrangement 74 can include a pair of guide members 84 having a T-shape in cross section and the second coupling arrangement 78 can include a corresponding pair of guide channels 88 having a complimentary T-shape so as to removably receive the guide members 84. In the exemplary configuration illustrated in FIGS. 3 and 4, the receptacle 44 can include the second coupling arrangement 78 positioned at lateral sides 96 and at a center 102 so as to removably guide and couple each storage device to receptacle 44 and thus the pick-up truck 14. It should be appreciated, however, that various other coupling configurations can be utilized to facilitate guiding and coupling one or more of the storage devices 50 to receptacle 44 of pick-up truck 14.

Figure 3:
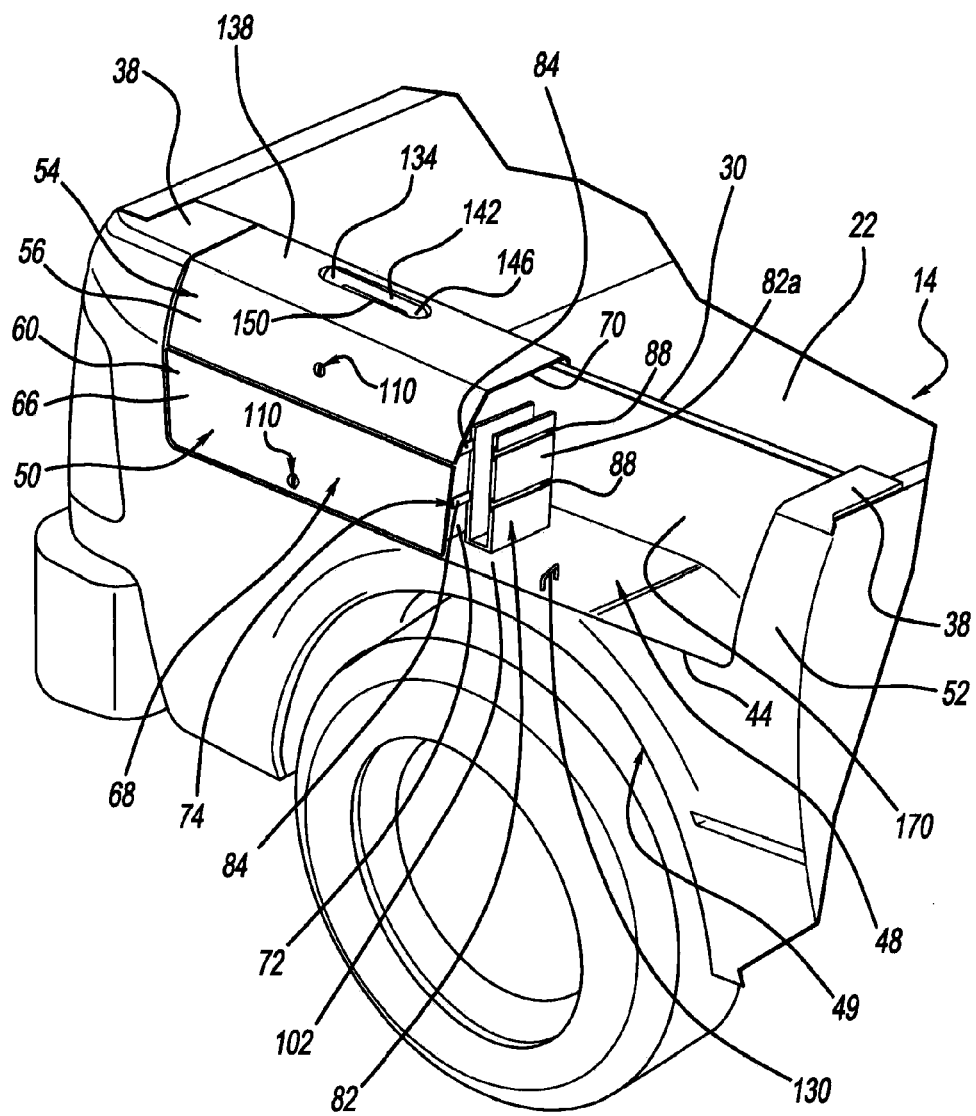
FIG. 3 is a partial perspective view showing one side of an exemplary attachment arrangement for the removable storage devices according to the principles of the present disclosure.

In the exemplary configuration illustrated in FIGS. 2 and 3, each of the lateral side walls 72 can be recessed or positioned inward relative to respective edges 70 of the upper and lower portions 54, 60 so as to accommodate support members or brackets 82 defining guide channels 88. In one exemplary configuration, one of the brackets 82 can be provided in the form of a U-shaped bracket 82a having two pair of guide channels 88 for receiving guide members 84 of adjacent removable storages devices 50, as shown for example in FIGS. 2 and 3.

Figure 4A:
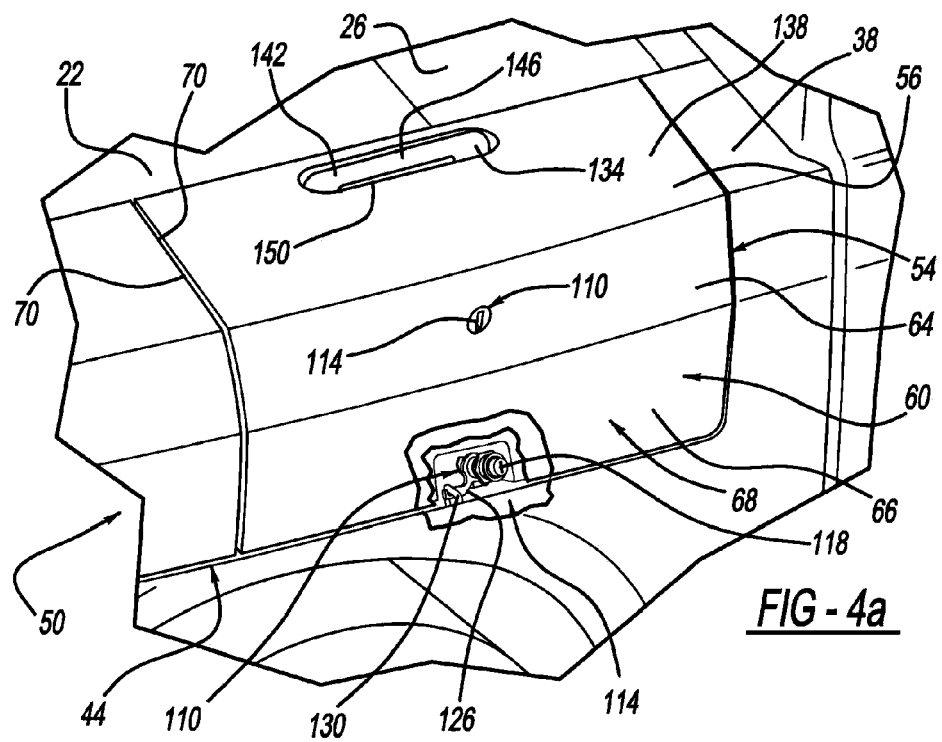
FIG. 4a is a partial perspective view of one of the removable storage devices with a portion cut away so as to illustrate an exemplary latching arrangement according to the principles of the present disclosure.
Figure 4B:
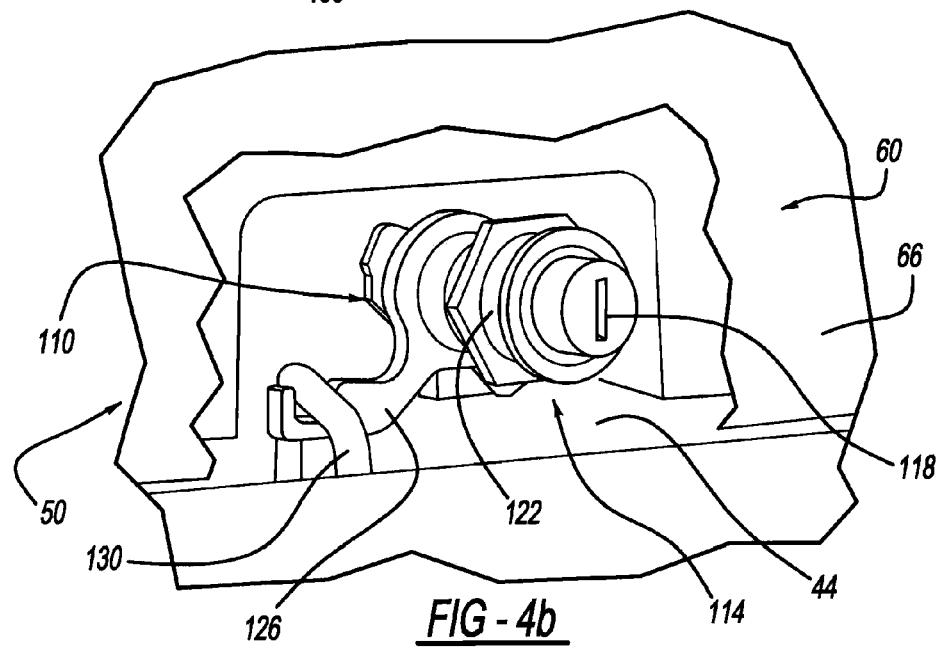
FIG. 4b is an enlarged view of the cutaway portion of FIG. 4a illustrating the exemplary latching arrangement according to the principles of the present disclosure.
Figure 5:
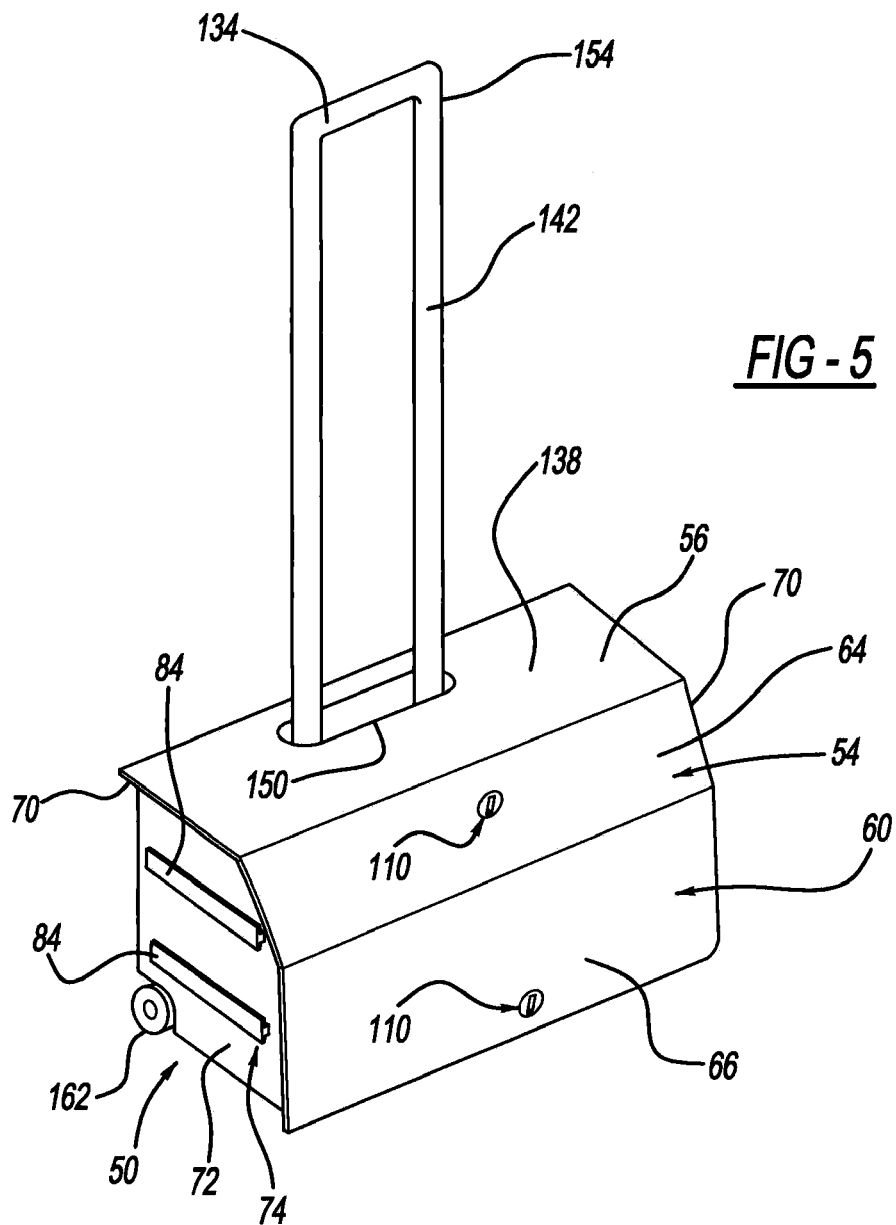
FIG. 5 is a perspective view of the exemplary storage device removed from the vehicle and in an exemplary configuration having an extended handle according to the principles of the present disclosure.

With particular reference to FIGS. 4a and 4b, the lower portion 60 of removable storage devices 50 can include a locking latch mechanism 110 for securing the storage devices 50 to the pick-up truck 14. In the exemplary configuration illustrated, the latch mechanism 110 can include a key lock arrangement 114 having a key slot 118 associated with a lockable cylinder 122 that is coupled to a latch arm 126. The latch arm 126 can be locked in engagement with a receiving member 130 fixed to the receptacle 44 or surrounding vehicle structure to secure the respective storage device 50 in the stowed position in receptacle 44, as shown for example in FIG. 4b with reference to FIG. 2. Similarly, the latch mechanism 110 can be unlocked to release latch arm 126 from member 130 to facilitate removing storage device(s) 50 from receptacle 44, as shown for example in FIG. 2 with reference to FIG. 4b.

The upper portion 54 can also include another latching mechanism 110 to facilitate coupling lid 56 to the lower portion 60 and an optional handle 134 to facilitate transporting the storage device(s) 50 remote from pick-up truck 14. Although not specifically shown in the exemplary configuration illustrated in FIGS. 1-5, latching mechanism 110 associated with lid 56 can include another key lock arrangement 114 for locking and unlocking lid 56 relative to lower portion 60. The optional handle 134 can be positioned about a top 138 (FIG. 5) of upper portion 54 and can be in the form of a fixed handle or a telescoping handle 142. The telescoping handle 142 can be extended from a stowed position 146 in a recess 150 to a deployed position 154, as shown for example in FIG. 5 with reference to FIG. 1. The lower portion 60 can also include an optional pair of rolling members or wheels 162 to facilitate rolling the removable storage device 50 in connection with extended telescoping handle 142.

With reference back to FIGS. 2 and 4a, the removable storage device arrangement 10 can include a biasing member 166 configured to engage receptacle 44 and removable storage device(s) 50. The biasing member can include, for example, a spring or other elastic member, such as a rubber cushion that is configured to be compressed when the removable storage device(s) 50 are positioned in receptacle 44 to the stowed position 68 (FIG. 1). In this exemplary configuration, the biasing member 166 can provide for reducing potential vibration or movement of the removable storage device(s) relative to receptacle 44. The biasing member 166 can also serve to provide for assisting a user in removing the storage device(s) 50 from receptacle 44 by urging the storage device(s) 50 outward upon release of the latch mechanism 110 from receiving member 130. In the exemplary configuration shown in FIG. 2, the biasing member 166 can be in the form of the rubber cushion or pad and can be associated with a rear wall 170 of receptacle 44.

It should be understood that the mixing and matching of features, elements and/or functions between various examples may be expressly contemplated herein so that one skilled in the art would appreciate from the present teachings that features, elements and/or functions of one example may be incorporated into another example as appropriate, unless described otherwise above.

What is claimed is:

1. A cargo management system for a vehicle, the vehicle including a cargo bed and an inner side wall having a first side facing the bed and an opposite side facing an exterior panel of the vehicle, the inner side wall spaced apart from the exterior panel, comprising:
   a receptacle formed relative to the exterior panel of the vehicle, the receptacle extending from the inner side wall to the exterior panel, the receptacle having a rear wall spaced apart from an outer surface of the exterior panel, the outer surface of the exterior panel having a first contour;
   a removable storage device configured to be removably received in the receptacle and selectively secured to the vehicle, the removable storage device including:
      an upper portion;
      a lower portion, the upper portion pivotable relative to the lower portion to provide access to an interior of the removable storage device; and
      a latch mechanism configured to selectively secure the removable storage device to the vehicle when in a stored position in the receptacle;
      wherein an outer surface of the upper portion and an outer surface of the lower portion comprise a second contour, the second contour substantially matching the first contour; and
   a biasing member configured to engage the receptacle and the removable storage device at least when the removable storage device is in the stored position, the biasing member configured to bias the removable storage device away from a rear wall of the receptacle.

2. The system of claim 1, wherein the upper portion is hingably coupled to the lower portion with a hinge, and wherein the hinge is adjacent to the inner side wall when the removable storage device is stored in the receptacle.

3. The system of claim 1, wherein the receptacle is positioned at least partially over a rear wheel well of the vehicle.

4. The system of claim 1, wherein the removable storage device includes a portable removable storage device comprising an interior compartment defined by the upper portion and the lower portion, a handle positioned proximate the upper portion, and wheels coupled to the lower portion.

5. The system of claim 4, wherein the handle comprises a telescoping handle.

6. The system of claim 1, further comprising:
   first and second guide channels positioned relative to the receptacle; and
   first and second guide members associated with the removable storage device, the first and second guide members configured to be removably slidably received in the first and second guide channels to facilitate positioning the removable storage device in the stored position in the receptacle.

7. The system of claim 6, wherein the first and second guide channels and the first and second guide members each comprise a T-shape in cross section.

8. The system of claim 1, wherein the latch mechanism includes a key-lock latch mechanism associated with the lower portion of the removable storage device.

9. The system of claim 1, wherein the biasing member comprises an elastic pad associated with the rear wall of the receptacle.

10. The system of claim 1, further comprising a second latch mechanism associated with the upper portion and configured to releasably secure the upper portion to the lower portion.

11. The system of claim 1, wherein the removable storage device comprises a first and a separate second removable storage device each configured to be removably received in the receptacle and selectively secured to the vehicle.

12. The system of claim 11, wherein the first and second removable storage devices are positioned contiguous to each other when stored in the receptacle.

13. The system of claim 1, wherein a portion of the inner side wall of the vehicle provides the rear wall of the receptacle and outer surfaces of the upper portion and lower portion of the removable storage device are sized and shaped so as to align with a size and shape of the exterior panel and a size and shape of a top panel spanning between the inner side wall and the exterior panel.

14. A cargo management system for a vehicle, comprising:
   a receptacle formed relative to an exterior panel of a pickup truck, the pick-up truck having a cargo bed and an inner side wall with a first side facing the cargo bed and an opposite side facing the exterior panel, the receptacle positioned between the exterior panel and the inner side wall, the outer surface of the exterior panel having a first contour;
   first and second removable storage devices each configured to be removably received in the receptacle and selectively secured to the pick-up truck, each removable storage device including:
      an upper portion;
      a lower portion, the upper portion being pivotably coupled to the lower portion to provide access to an interior compartment of the removable storage device; and
      a latch mechanism associated with the lower portion and configured to selectively secure each removable storage device to the pick-up truck when in a stored position in the receptacle;
      wherein an outer surface of the upper portion and an outer surface of the lower portion comprise a second contour, the second contour substantially matching the first contour; and
   a biasing member configured to engage the receptacle and each removable storage device at least when each removable storage device is in the stored position in the receptacle, the biasing member configured to bias each removable storage device away from a rear wall of the receptacle.

15. The system of claim 14, wherein each removable storage device includes a portable removable storage device comprising a telescoping handle positioned proximate the upper portion and wheels coupled to the lower portion.

16. The system of claim 14, further comprising:
   a first pair and a second pair of channels coupled to the receptacle; and
   a first pair and a second pair of guide members associated with lateral sides of each respective removable storage device, the first and second pair of guide members configured to be removably slidably received in the respective first and second pair of guide channels to facilitate positioning each removable storage device in the stored position in the receptacle.

17. The system of claim 16, wherein the first and second pair of guide channels and the first and second pair of guide members each comprise a T-shape in cross section.

18. The system of claim 14, wherein the receptacle is positioned at least partially over a rear wheel well of the pick-up truck, and wherein the first and second removable storage devices are positioned contiguous to each other when stored in the receptacle.

19. The system of claim 14, wherein the biasing member comprises an elastic pad associated with the rear wall of the receptacle.

* * * * *